G. M. WESTERBERG.
CYCLE PEDAL.
APPLICATION FILED FEB. 27, 1914.
1,122,342.
Patented Dec. 29, 1914.
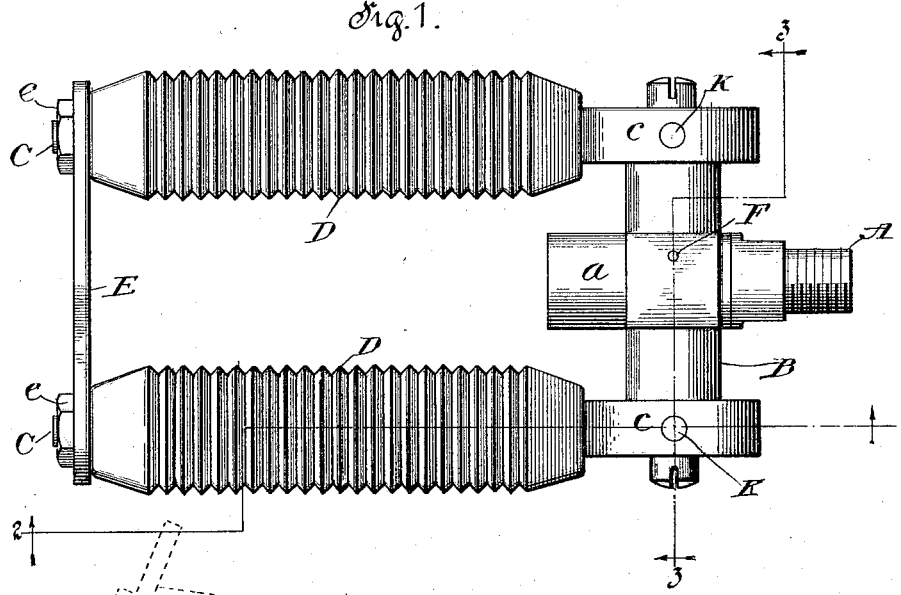
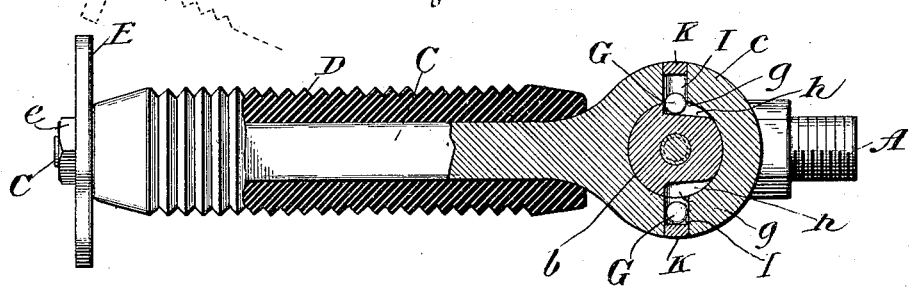
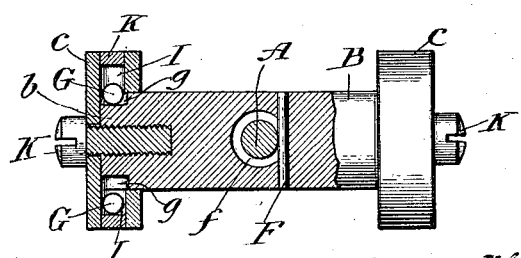
Witnesses
Arthur W. Carlson
E. F. Lundy
Inventor
George M. Westerberg
By Frank D. Thomason
Atty.

UNITED STATES PATENT OFFICE.

GEORGE M. WESTERBERG, OF CHICAGO, ILLINOIS.

CYCLE-PEDAL.

1,122,342.   Specification of Letters Patent.   Patented Dec. 29, 1914.

Application filed February 27, 1914. Serial No. 821,356.

*To all whom it may concern:*

Be it known that I, GEORGE M. WESTERBERG, a citizen of the United States, residing at Chicago, in the county of Cook and State of Illinois, have invented certain new and useful Improvements in Cycle-Pedals, of which the following is a full, clear, and exact description.

My invention relates to pedals for bicycles, motor-cycles, and other vehicles capable of foot propulsion. Heretofore, when making short turns with vehicles of this kind, a pedal will strike the ground, or, when running next the curbing on either side of the street the pedal may strike against the same and be bent so that it is necessary to straighten it out, or otherwise repair it before it can be used again, and often when too badly damaged it is necessary to substitute a new pedal. Oftentimes a bicycle or motor-cycle, when left standing by itself will be knocked or blown down and bend the pedal or so badly damage it that it is necessary to make extensive repairs thereto.

The object of my invention is to enable the pedal to revolve freely on its axis on the crank-pin, and at the same time be capable of being swung upward toward the crank-spindle whenever it strikes against the ground or curbing or other obstacle in the way of its free revolution around the axis of said spindle without affecting its ability to resist the foot-pressure necessary to transmit motion to the driving mechanism of the vehicle. This I accomplish by the means and in the manner hereinafter fully described and as particularly pointed out in the claims.

In the drawings: Figure 1 is a plan view of my invention. Fig. 2 is a longitudinal section taken on line 2—2, Fig. 1. Fig. 3 is a transverse vertical section taken on line 3—3, Fig. 1.

In the drawings, A represents the crank-pin that is usually inserted and screwed into the outer end of the crank (not shown) of a foot-propelled vehicle, and which projects at right-angles therefrom into the inner cross-frame B of the pedal. The inner cross-frame of my improved pedal consists of a cylindrical shaped metal member which is made substantially square in cross-section at its center of length and which has a transverse cylindrical boss $a$ of about the same diameter which is bored centrally and longitudinally for the reception of the crank-pin. The pedal is prevented from slipping off the crank-pin seated in boss $a$ by providing the latter with a circumferential groove $f$ and driving a small pin F vertically through said cross-frame substantially as shown in Fig. 3 of the drawings. The ends $b$ of this inner cross-frame are preferably of the same diameter as the remainder of its length and constitute journals upon which the circular knuckles $c$ at the rear ends of the corresponding longitudinal side-bars C of the pedals are hinged. The central openings in these knuckles into which said journals are inserted preferably do not extend entirely through the same, but said central openings are closed on their outer sides and screws K are tapped centrally through the same and axially into the ends of said cross-frame B to secure the bars C thereto. These knuckles are greater in vertical dimensions but are preferably of the same width as the remainder of length of the side-bars, which latter extend through and are incased in suitably designed foot-pads D. The forward ends of these bars C project beyond said foot-pads and through the outer cross-frame E consisting of a flat plate of any suitable design, and said bars have their outer ends screw-threaded and nuts $e$ screwed onto the same to clamp the cross-frame E and foot-pads D in place.

In order to accomplish the objects hereinbefore set forth and to permit the pedal to swing upward toward the crank-spindle as well as to resist the foot-pressure during the transmission of propelling power to the machine, the journals $b$ on the ends of the inner cross-frame A are provided with diametrically opposite pockets $g$ that are intersected by a vertical plane extending longitudinally through the axis of said journals. The forward sides of these pockets are made vertical to provide abrupt shoulders, and gutters $h$, the bottoms of which are practically horizontal, extend from the bottoms of said pockets on one side inwardly to the periphery of the journals. Suitable steel balls G are adapted to engage these pockets and also to engage vertical holes I made in the knuckles. These holes are slightly greater in diameter than the balls G and their vertical axes intersect the centers of the journals, and said holes are made by boring vertically through the knuckles before the parts of the pedal are assembled. The outer ends of these holes I are closed by the plugs $k$ or in any other suitable manner after the balls have been inserted in place, substantially as shown in Figs. 2 and 3 of the drawings.

The operation of my improved pedal is very simple. In its normal position the lower ball used in connection with each journal will gravitate into the opening I, and the upper ball will gravitate into the pocket $g$ in the journal. The weight of the pedal itself or the foot-pressure thereon will have a tendency to swing the pedal downward and cause the upper ball to be pinched between the edges of the lower end of the hole I and the forward shoulders of the pockets, and thus hold said pedal horizontal and prevent the downward movement thereof. However, when the pedal strikes the ground or other obstruction either when turning the vehicle or when some obstruction comes into the path of the pedal, the lower ball G offers no resistance to the upward movement of the pedal, and the upper ball will be moved to the rear, and be moved along in the horizontally disposed gutter $h$ until it is pushed up into the respective hole I in the knuckle where it will be out of the way.

It will be observed that the construction of my improvement does not prevent the pedal revolving freely on the axis of the crank-pin, and that no matter which side of said pedal is up or down, the position of the steel balls G will, by their own gravity, automatically assume the position shown in Fig. 2 of the drawings.

I do not wish to be confined to the exact construction and arrangement of the steel balls and the gutters in which the same operate, as hereinbefore described, because it is obvious that the same may be changed and other mechanical equivalents substituted therefor without departing from the spirit of my invention as set forth in the claims.

What I claim as new is:—

1. A cycle pedal comprising an inner cross-frame, a normally horizontal foot-rest hinged thereto, and gravity-controlled means that permit said foot-rest to swing upward and prevent downward movement thereof.

2. A cycle pedal comprising a crank-pin, an inner cross-frame journaled thereon, parallel side-bars hinged at one end to said cross-frame, a cross-plate connecting the opposite ends of said side-bars, and gravity controlled means that permit said side-bars swinging upward and prevent them swinging downward.

3. A cycle pedal comprising a crank-pin, an inner cross-frame journaled thereon, parallel side-bars hinged at one end to said cross-frame and are provided with knuckles at one end that are journaled on said cross-frame, a cross-plate connecting the opposite ends of said side-bars, and gravity-controlled means that permit said side-bars swinging upward and prevent them swinging downward.

4. A cycle pedal comprising a crank-pin, an inner cross-frame journaled thereon, parallel side-bars provided with knuckles at one end that are journaled on said cross-frame, a cross-plate connecting the opposite ends of said side-bars, and gravity-controlled balls engaging recesses made in journaling surfaces of said knuckles and cross-frame that permit said side-bars swinging upward and prevent them swinging downward.

5. A cycle pedal comprising a crank-pin, an inner cross-frame journaled thereon, parallel side-bars provided with knuckles at one end that are journaled on said cross-frame, a cross-plate connecting the opposite ends of said side-bars, recesses made in the journaling surfaces of said knuckles and cross-frame, and gravity-controlled means seated in said recesses that permit said side-bars swinging upward and prevent them swinging downward.

6. A cycle pedal comprising a crank-pin, an inner cross-frame journaled thereon, parallel side bars hinged at one end to said cross-frame, said side-bars and cross frame provided with alining recesses that communicate with each other when said side-bars are in their normal substantially horizontal plane, a cross-plate connecting the outer ends of said side-bars, and devices within said recesses that permit said side-bars swinging upward and prevent them swinging downward.

7. A cycle pedal comprising a crank-pin, an inner cross-frame journaled thereon, parallel side-bars hinged at one end to said cross-frame, said side-bars and cross-frame provided with alining recesses that communicate with each other when said side-bars are in their normal substantially horizontal plane, a cross-plate connecting the outer ends of said side-bars, and gravity-controlled means disposed in said recesses that permit said side-bars swinging upward and prevent them swinging downward.

8. A cycle pedal comprising a crank-pin, an inner cross-frame journaled thereon, parallel side-bars hinged at one end to said cross-frame, said side-bars and cross-frame provided with alining recesses that communicate with each other when said side-bars are in their normal substantially horizontal plane, a cross-plate connecting the outer end of said side-bars, and gravity controlled balls engaging said recesses that permit said side-bars swinging upward and prevent them swinging downward.

In testimony whereof I have hereunto set my hand, at Chicago, Illinois, this 25th day of February, 1914.

GEORGE M. WESTERBERG.

Witnesses:
FRANK D. THOMASON,
FLORENCE MITCHELL.

Copies of this patent may be obtained for five cents each, by addressing the "Commissioner of Patents, Washington, D. C."